United States Patent [19]

Baumard et al.

[11] Patent Number: 4,999,182

[45] Date of Patent: Mar. 12, 1991

[54] STABILIZED ZIRCONIA POWDERS

[75] Inventors: Jean-Francois Baumard, Limoges; Bertrand Dubois, Orleans; Philippe Odier, Saint-Denis en Val, all of France

[73] Assignee: Rhone-Poulenc Chimie, Courbevoie, France

[21] Appl. No.: 282,566

[22] Filed: Dec. 12, 1988

[30] Foreign Application Priority Data

Dec. 11, 1987 [FR] France .................................. 87 16549

[51] Int. Cl.⁵ ...................... C01G 25/02; C04B 35/48
[52] U.S. Cl. .................................... 423/608; 423/266; 501/103; 501/104
[58] Field of Search ................ 423/608, 266; 501/103, 501/104

[56] References Cited

U.S. PATENT DOCUMENTS

| | | | |
|---|---|---|---|
| 4,619,817 | 10/1986 | Stambaugh | 501/104 |
| 4,639,356 | 1/1987 | O'Toole | 423/266 |
| 4,788,045 | 11/1988 | Colombet | 501/103 |
| 4,789,651 | 12/1988 | Masuo et al. | 501/103 |

Primary Examiner—Gary P. Straub
Assistant Examiner—Steven Bos
Attorney, Agent, or Firm—Burns, Doane, Swecker & Mathis

[57] ABSTRACT

Sinterable, morphologically and chemically homogeneous stabilized zirconia fine powders, e.g., yttrium-stabilized zirconia powders, are prepared by heat treating aerosol droplets which comprise a mixed precursor solution of at least one inorganic zirconium salt and at least one inorganic salt of a zirconia-stabilizing element, said heat treating including (a) heating the aerosol droplets to a temperature of from 400° to 500° C. for a period of time of from 4 seconds to 2 hours, and thereafter (b) calcining such droplets at a temperature of from 650° to 1,250° C.

23 Claims, 2 Drawing Sheets

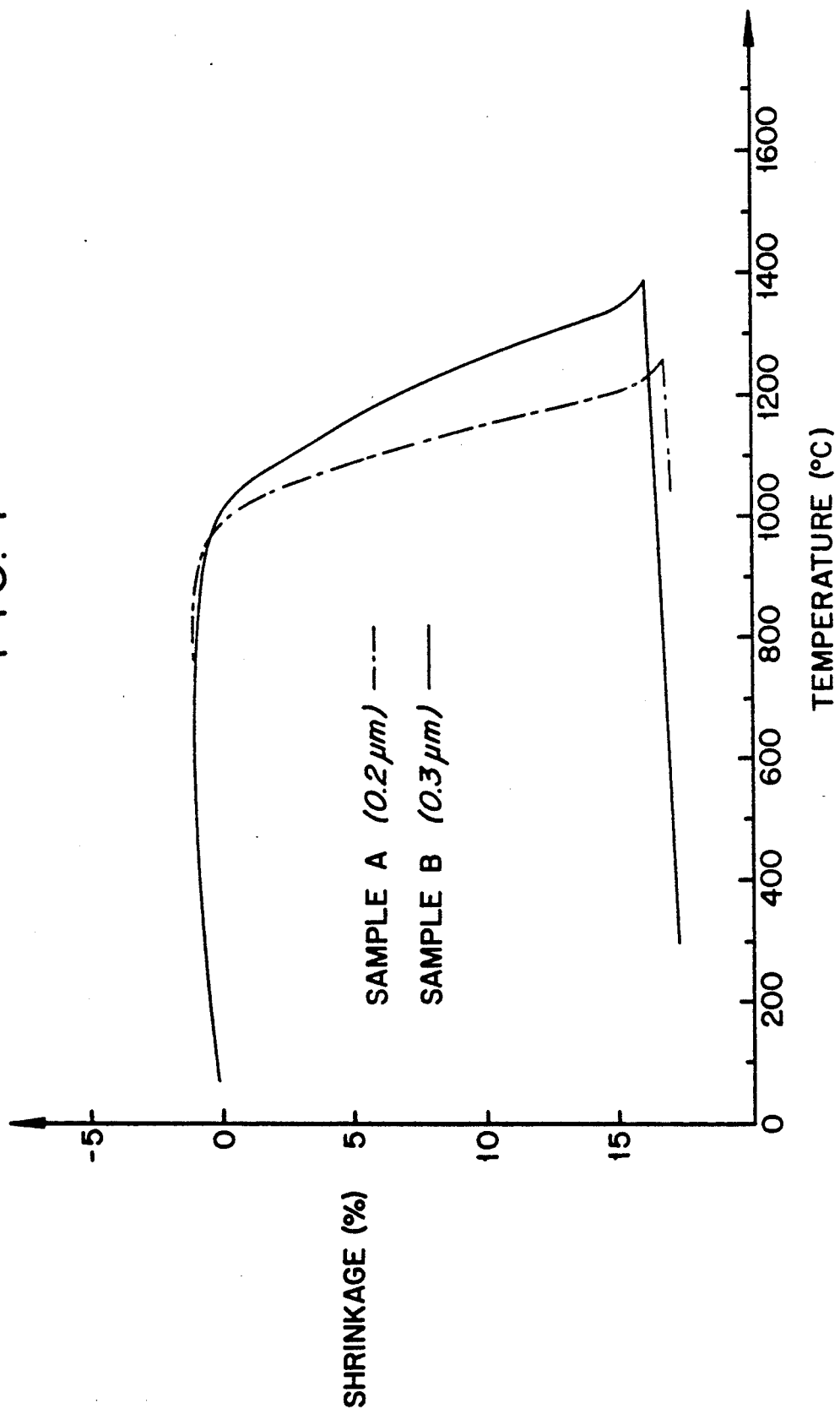

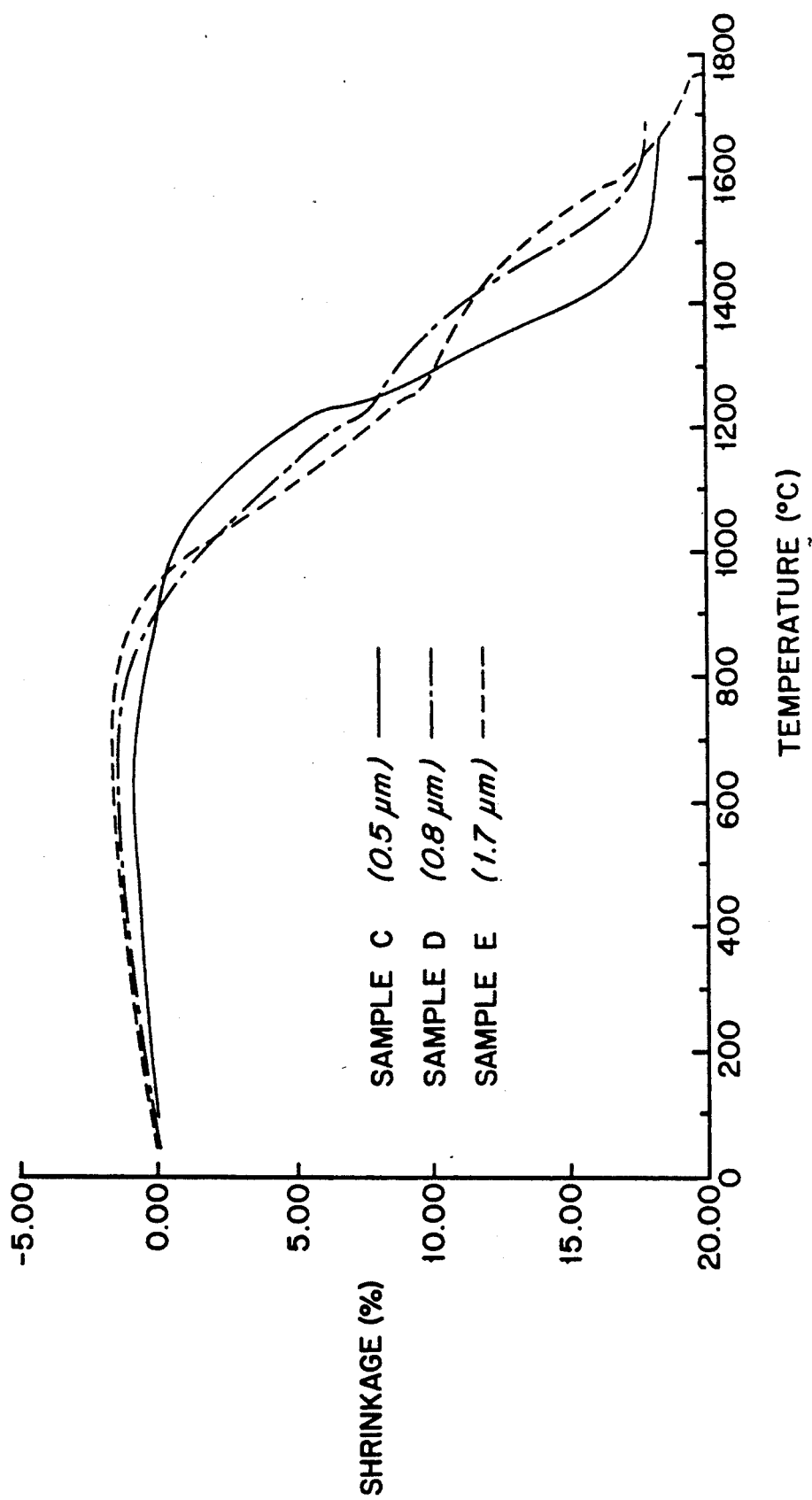

STABILIZED ZIRCONIA POWDERS

BACKGROUND OF THE INVENTION

1. Field of the Invention:

The present invention relates to novel fine powders of stabilized zirconia, to a process for the preparation thereof, and to the use of such powders for the production of ceramic materials having desirable mechanical, thermomechanical and electrical properties.

2. Description of the Prior Art:

Stabilized zirconia, and in particular zirconia stabilized with yttrium, magnesium, calcium or cerium values, is frequently used for the production of ceramic shaped articles.

It is known to this art that the production of dense, high purity ceramic materials having good homogeneity, relative both to chemical composition and to microstructure, is dependent on first providing special powders which are both very fine and highly homogeneous chemically. However, the preparation of such very fine powders presents various problems in relation to their processing parameters.

Among the several processes that currently exist for the preparation of such powders, one of the most interesting entails heat treating fine droplets obtained by the pulverization (or atomization) of a solution of precursors of the desired product.

Thus, in *American Ceramic Society Bulletin*, 65, No. 10, pp. 1399–1404 (1986), a process is described for the preparation of yttriated zirconia powder by the heat treatment of fine droplets consisting of a mixture of zirconium alkoxides and yttrium in solution in an organic solvent, (more precisely, a mixture of zirconium n-butoxide and yttrium isopropoxide in solution in anhydrous ethanol), with the fine dispersion of droplets being provided by means of an atomizer equipped with an ultrasonic generator.

However, such a process has several disadvantages, both relative to its application and to the powders obtained.

On the one hand, it requires alkoxy compounds; these compounds are expensive and are not readily available commercially.

On the other hand, it requires expensive and sometimes dangerous organic solvents, which are lost in the drying stage and which render the process particularly uneconomical.

Finally, the powders obtained by this process have capabilities in regard to forming and sintering which appear to be insufficient, especially concerning raw densities and final densities after sintering, which indicates an inadequate chemical and/or morphological quality of the powders themselves.

SUMMARY OF THE INVENTION

Accordingly, a major object of the present invention is the provision of very fine stabilized zirconia powders displaying excellent sinterability relative both to the raw densities that may be realized after forming, as well as to the final densities measured after sintering. Also, the subject powders provide excellent homogeneity of grain size distribution after sintering.

Another object of the present invention is the provision of an improved process for the preparation of stabilized zirconia powders which does not require the use of organic precursors of the stabilized zirconia or of organic solvents, thereby eliminating the disadvantages inherent in such uses.

Briefly, the present invention features the preparation of fine particles of zirconia which are stabilized by the heat treatment of a aerosol containing a precursor of said stabilized zirconia, the process being characterized in that said precursor is a mixture, in a solvent, of at least one inorganic zirconium salt and at least one inorganic salt of the stabilizing element, and in that the heat treatment of the aerosol comprises at least:

(a) heating it to a temperature of from 400° to 500° C. for a period of time of from 4 seconds to 3 hours; and (b) calcining the heat-treated droplets at a temperature of from 650° to 1,250° C.

Thus, the present invention not only permits avoiding the use of organic precursors and solvents, but also features the notably reproducible preparation of very fine powders of stabilized zirconia which are uniformly homogeneous, both chemically and morphologically, and which display remarkable sintering properties, which make them particularly suitable for the production of high strength ceramic materials.

BRIEF DESCRIPTION OF THE DRAWINGS

FIG. 1 is a graph depicting the shrinkage as a function of temperature for samples A and B; and FIG. 2 is a graph depicting the percent shrinkage as a function of time for the samples C, D, and E.

DETAILED DESCRIPTION OF THE PREFERRED EMBODIMENTS OF THE INVENTION

More particularly according to the present invention, the precursor solution of the stabilized zirconia thus comprises a preferably aqueous solution containing at least one inorganic zirconium salt and at least one inorganic salt of the stabilizing element.

If necessary, certain adjuvant chemical compounds may be added to the aqueous solution to assist in the solubilization of the precursors.

Optionally, a solvent other than water may be used, such as, for example, an alcohol, provided that said salts are soluble in such a solvent.

The inorganic zirconium salt is advantageously selected from among the nitrates, sulfates, halides, and more particularly the chlorides of zirconium, or zirconyl.

Preferably, zirconyl chloride is used.

The element stabilizing the zirconia is preferably selected from among yttrium, calcium, magnesium and cerium. In an even more preferred embodiment of the invention, the stabilizing element is yttrium.

The salt of the stabilizing element may be a halide, a sulfate or a nitrate. However, a solution of a nitrate of the stabilizing element is preferably used.

In actual practice, the ratio of the molar concentrations of the inorganic zirconium salt to the inorganic salt of the stabilizing element contained in the initial aqueous solution is selected in a manner such that the amount of the stabilizing element (expressed as the oxide thereof) in the zirconia powder ranges from 0.001 to 30 molar molar % and preferably from 1.5 to 10 molar %, and even more preferably from 2 to 3%, if the stabilizing element is yttrium.

The initial aqueous solution thus prepared, containing the inorganic precursors of the stabilized zirconia, is then atomized as to provide an aerosol. By the term "aerosol" is intended any system of fine droplets dispersed in a gas.

This aerosol may be prepared using any type of known pulverizer, for example a pulverizing nozzle of the rose sprinkler or any other type. However, certain pulverizers may be inadequate for producing droplets that are both very fine and very homogenous relative to grain size distribution.

For this reason, it is advantageous according to the invention to use certain highly specific pulverizers, such as pneumatic or ultrasonic atomizers.

In a preferred embodiment of the invention, an ultrasonic atomizer is used; this type of atomizer is especially suitable for the perfectly reproducible production of aerosols comprising very fine spherical droplets which are homogeneous in size.

This type of atomizer is described, in particular, by R.J. Lang in an article entitled "Ultrasonic Atomization of Liquids" (*J. Acoust. Soc. Am.*, 34, No. 1, pages 6–8 (1962)).

Consistent herewith, the mean diameter of the aerosol droplets ranges from 0.5 micron to 6 microns, and more preferably from 1 micron to 4.5 microns. As indicated in the aforecited article, the mean size of said droplets is regulated by varying, independently or simultaneously, the excitation frequency of the atomizer and/or the density of the solution and/or the surface tension thereof.

The formed droplets are then entrained in a vector gas. It is preferable that this gas be inert relative to the components of the droplets. This gas may, for example, be nitrogen. Air is also suitable.

The aerosol is then transferred into one or more furnaces and subjected to a heat treatment. It is essential that this heat treatment retain the near perfect chemical homogeneity and monodispersity of the spherical droplets produced by pulverization. According to the invention, the heat treatment is characterized in that it comprises at least:

(a) heating the aerosol droplets to a temperature of from 400° to 500° C., preferably to about 450° C., for a period of time of from 4 seconds to 2 hours; and (b) calcining the thus treated droplets at a temperature of from 650° to 1,250° C., preferably from 650° to 1,000° C.

The duration of the calcination may range from 10 minutes to 5 hours, for example, and preferably from 1 to 2 hours.

The heat treatment may be carried out either continuously or discontinuously. It is preferably carried out continuously, if the calcination is conducted directly on the particles obtained at the end of the temperature maintenance in the heating stage. It is carried out discontinuously, if the calcination is conducted on particles which, for example, were cooled to ambient temperature after the heating stage.

Preferably, the heat treatment is carried out in air or in an inert atmosphere such as nitrogen, but preferably in air.

Following this particular heat treatment, a fine powder of stabilized zirconia is produced, in a quadratic or cubic form, comprising spherical particles having preserved the perfect morphological homogeneity of the initial droplets.

The particles then have a macroscopic grain size distribution of from approximately 0.1 to 3 microns, but centered with a very low standard deviation (less than 0.4) on a mean diameter, which, according to the initial distribution of the droplet size, ranges from 0.1 to 2 microns and preferably from 0.2 to 1.8 microns.

These particles are elementary crystals having a size of from 100 to 500 Å, preferably from 100 to 150 Å.

Also, the powder has a porosity of from 0.11 to 0.14 $cm^3/g$, of which the microporosity is on the order of 30%, and which may be effectively eliminated by a heat treatment at a temperature of from 900° to 1,200° C., signifying that the particles obtained are then extremely dense.

The specific surface of the powder, measured by the BET method, ranges from 2 to 30 $m^2/g$, depending on the particular heat treatment.

The stabilized zirconia powders according to the invention may also be characterized by their remarkable and surprising properties relative to their sinterability.

It is indeed possible, with powders that are still submicronic, to provide extremely high raw densities, which translate into very high reactivity and very low shrinkage during sintering. The excellent compactability of these powders may be explained, in particular, by the perfect monodispersed nature of the spheres constituting said powders.

Practically, a stabilized zirconium powder may be formed under pressure (200 to 480 MPa) according to the invention until a product is obtained having a raw density of from 45% to 61% of the theoretical density of the zirconia desired, whereupon an isothermal sintering is carried out, without filler, at a temperature generally ranging from 1,250° to 1,450° C., and more particularly equal to about 1,300° C., for a period of time of from 2 h to 5 h, and more particularly 3 h, such as to provide a sintered stabilized zirconia having a final density greater than or equal to 99% of the theoretical density of the desired zirconia.

It is further observed that the grain size of the sintered product essentially corresponds to that of the particles constituting the initial powder.

The stabilized zirconia powder according to the invention may be used to produce ceramic materials having good mechanical, thermomechanical and/or electrical properties. In particular, it is used for the production of supports and crucibles intended for high temperature applications, and also for the production of oxygen probes, tools and engine parts normally subjected to high temperatures.

In order to further illustrate the present invention and the advantages thereof, the following specific examples are given, it being understood that same are intended only as illustrative and in nowise limitative.

EXAMPLES (I) PROCEDURE:

An aqueous mixture of zirconium oxychloride and yttrium nitrate was prepared. The amounts of the salts introduced were such that they resulted in the production of a stabilized zirconia having a yttrium content, expressed as $Y_2O_3$, of 3 molar %.

Five aqueous mixtures were prepared by varying the initial zirconium concentration (expressed as $ZrO_2$):

Sample A: 0.02 mole/l
Sample B: 0.04 mole/l
Sample C: 0.02 mole/l
Sample D: 0.08 mole/l
Sample E: 0.67 mole/l The mixture was then pulverized by means of an ultrasonic atomizer; the excitation frequency was controlled to yield either droplets having a mean diameter of approximately 2.2 μm (for Samples A and B), or droplets having a mean diameter of 4.5 μm (for Samples C, D and E).

The fine droplets of the aerosol were then transported pneumatically by air (flow rate: 50-300 1/h), then dried and calcined in one or more furnaces, depending upon the particular experiment.

II. RESULTS:

(A) Experiment 1:

Samples A, B, C, D and E were treated according to the procedure described above, but employing a heat treatment not according to the invention, i.e., a direct increase in temperature to 700° C.

It was then found that the particles obtained were hollow and fractured, and thus not suitable for proper sintering.

(B) Experiment 2:

Samples A, B, C, D and E were again treated by the same procedure and subjected to a heat treatment according to the invention:

(a) increase in temperature to 450° C., then maintenance at this temperature for 1 hour;

(b) temperature increase to 650° C. for Samples A and B, and to 700° C. for Samples C, D and E, and temperature maintenance for 2 hours at this temperature in both cases.

The characteristics of the resulting powders were the following:

(a) Morphology:

Granulometric analysis, reported in Table I, showed a very homogeneous and quasi-monodispersed distribution of particle sizes.

TABLE I

| Sample | Diameter Range (μm) | Mean Diameter (μm) | Mean Deviation | Standard Deviation |
|---|---|---|---|---|
| A | 0.1–0.8 | 0.2 | 0.06 | 1.27 |
| B | 0.15–1.0 | 0.3 | 0.11 | 1.35 |
| C | 0.1–1.2 | 0.5 | 0.15 | 1.31 |
| D | 0.1–1.7 | 0.8 | 0.21 | 1.26 |
| E | 0.2–3.5 | 1.8 | 0.4 | 1.24 |

Analysis by electron microscope and X-ray diffraction showed that the particles were present in the form of near perfect spheres, which demonstrates that the heat treatment according to the invention retained the morphological homogeneity of the initial droplets. The same analysis also revealed that every particle of the powder was an agglomerate of fine crystals, the size of which varied from 110 to 140 Å, depending upon the particular sample:

Sample A: 125 Å
Sample B: 130 Å
Sample C: 133 Å
Sample D: 114 Å
Sample E: 117 Å

The analysis also showed that the powders were present in a quadratic form.

A study of the internal texture of the spherical particles (carried out on a polished specimen) revealed the very dense character of the latter.

(b) Compactability:

Four powders, originating respectively from Samples A, B, D and E, were compacted under isostatic pressures of 4.8 g/cm$^2$ (480 MPa). Analysis of the microstructure of the compacted shaped articles showed that the particles were not crushed during the formative process. Table II reports the raw density values obtained, together with the results of porosimetric measurements (mercury porosimeter) for Samples D and E.

TABLE II

| Sample | A | B | D | E |
|---|---|---|---|---|
| Apparent density | 3.29 | 3.34 | 3.35 | 3.28 |
| Compactness | 0.54 | 0.55 | 0.55 | 0.54 |
| Pore size (nm) | | | | |
| interagglomerate | — | — | 130 | 270 |
| intraagglomerate | | | 8 | 8 |
| Pore volume | | | | |
| accumulated (cm$^3$/g) | — | — | 0.12 | 0.14 |
| Calculated specific surface (m$^2$/g) | — | — | 30 | 20 |

For Samples D and E, a bimodal distribution of pores around some hundreds of nanometers and 8 nanometers, was found. From the porosity distributions, an intraagglomerate porosity of 30% may be estimated.

This microporosity may be effectively eliminated by a heat treatment above 700° C. to cause the spheres to sinter together.

(c) Sinterability:

(1) Dilatometric analysis:

The sinterability of five powders originating from the Samples A, B, C, D and E was evaluated, firstly by dynamic analysis carried out using a vertical high temperature dilatometer. The rate of increase in temperature was 250° C./h for Samples A and B, and 170° C./h for Samples C, D and E. Dilatometric curves are shown in FIGS. 1 and 2.

The three Samples C, D and E began to densify slowly at around 900° C. The densification kinetics accelerate above 1,200° C. as a function of the fineness of the grains.

The 0.5 μm powder (Sample C) had a marked sintering velocity around 1,400° C.

The last portion of the curves evidenced that there was no de-densification, even at very high temperatures.

Samples A and B began to sinter slowly at around 900° C. The densification kinetics accelerated above 1,100° C. as an inverse function of grain size. The 0.2 μm powder (Sample A) had a final sintering temperature of 1,260° C.

It therefore clearly appears that the final sintering temperature, in a dynamic mode, may be reduced by reducing the size of the particles: more than 300° C. could be gained by a reduction from 1.8 μm to 0.5 μm of the grain size; more than 500° C. could be gained by extending this reduction to 0.2 μm.

On the other hand, the microstructures of the sintered shaped articles were extremely uniform. The mean gain size of the sintered Samples A, B, D and E and their densities (measured by the Archimedes method) are reported in Table III.

TABLE III

| Sample | A | B | D | E |
|---|---|---|---|---|
| Grain size (μm) | 0.18 | 0.25 | 0.6 | 1.5 |
| Density (g/cm$^3$) | 6.05 | 6.06 | 6.07 | 6.06 |

It was found that the grains of the sintered articles corresponded remarkably well to those of the particles constituting the powder, and that no enlargement of their size was observed up to 1,600° C.

(2) Isothermal sintering:

(a) Isothermal sintering of the 0.2 μm powder (Sample A) was carried out at a temperature of 1,300° C. for 3 h. The raw density of the compacted shaped article (under 200 MPa) was 2.79 (more than 46% of the theoretical density). The density of the specimen sintered in air was 6.02, or 99% of the theoretical density. The mean grain size of the compacted sintered article was 0.18 μm.

(b) Isothermal sintering of the 0.3 μm powder (Sample B) was carried out at a temperature of 1,300° C. for 3 h. The raw density of the compacted shaped article (under 480 MPa) was 3.35 (or 55.3% of the theoretical density). The density of the specimen sintered in air was 6.02, or 99% of theoretical density. The mean grain size of the compacted sintered article was 0.22 μm.

(c) The 0.8 μm powder (Sample D) was sintered at a temperature of 1,450° C. for 3 h. The raw density of the compacted shaped article (under 480 MPa) was 3.27 (or 54% of theoretical density). The density of the sample sintered in air was 6.02, or 99% of theoretical density. The mean grain size of the compacted sintered article was 0.6 μm.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a fine stabilized zirconia powder, comprising heat treating chemically homogeneous and monodispersed aerosol droplets which comprise a mixed precursor solution of at least one inorganic zirconium salt and at least one inorganic salt of a zirconia-stabilizing element, said heat treating including (a) heating the aerosol droplets to a temperature of from 400° to 500° C. for a period of time of from 4 seconds to 2 hours, and thereafter (b) calcining such droplets at a temperature of from 650° to 1,250° C.

2. The process as defined by claim 1, said mixed precursor solution comprising an aqueous solvent.

3. The process as defined by claim 1, said at least one inorganic zirconium salt comprising a nitrate, sulfate or halide.

4. The process as defined by claim 3, said at least one inorganic zirconium salt comprising the chlorides of zirconium or zirconyl.

5. The process as defined by claim 4, said at least one inorganic zirconium salt comprising zirconyl chloride.

6. The process as defined by claim 3, said at least one inorganic salt of a zirconia-stabilizing element comprising a nitrate, sulfate or halide.

7. The process as defined by claim 6, said zirconia-stabilizing element comprising yttrium, cerium, calcium or magnesium.

8. The process as defined by claim 7, said at least one inorganic salt of a zirconia-stabilizing element comprising yttrium nitrate.

9. The process as defined by claim 1, wherein the amounts of zirconium and zirconia-stabilizing element in said mixed precursor solution are such that the amount of zirconia-stabilizing element in the final powder of stabilized zirconia ranges from 0.001 to 30 molar %.

10. The process as defined by claim 9, wherein the amount of zirconia-stabilizing element in the final powder of stabilized zirconia ranges from 1.5 to 10 molar %.

11. The process as defined by claim 10, wherein the zirconia-stabilizing element comprises yttrium and the amount of yttrium in the final powder of stabilized zirconia, expressed as $Y_2O_3$, ranges from 2 to 3 molar %.

12. The process as defined by claim 1, said aerosol droplets comprising fine spherical droplets homogeneous in size.

13. The process as defined by claim 12, said aerosol droplets having a mean diameter ranging from 0.5 to 6 microns.

14. The process as defined by claim 13, said aerosol droplets having a mean diameter ranging from 1 to 4.5 microns.

15. The process as defined by claim 1, wherein said heat treatment retains the chemical homogeneity and monodispersity of the aerosol droplets.

16. The process as defined by claim 1, said aerosol droplets having been generated by ultrasonic atomization.

17. The process as defined by claim 1, said heating (a) and calcination (b) being carried out in air.

18. The process as defined by claim 1, said heating (a) being at a temperature of about 450° C.

19. The process as defined by claim 1, said calcining (b) being at a temperature of from 650° to 1,000° C.

20. The process as defined by claim 19, comprising maintaining said calcining temperature for from 1 to 2 hours.

21. The process as defined by claim 1, carried out continuously.

22. The process as defined by claim 1, carried out discontinuously.

23. The process of claim 1, wherein the fine stabilized zirconia powder has a macroscopic grain size distribution of from about 0.1 to 3 microns, with a standard deviation of less than 0.4 microns on a mean diameter which ranges from 0.1 to 2 microns.

* * * * *